United States Patent
Douglas et al.

(10) Patent No.: US 12,208,890 B2
(45) Date of Patent: Jan. 28, 2025

(54) CONNECTOR

(71) Applicant: AIRBUS OPERATIONS LIMITED, Bristol (GB)

(72) Inventors: Paul Douglas, Bristol (GB); Anthony John Bryant, Bristol (GB); Daniel Peachey, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 1445 days.

(21) Appl. No.: 16/460,104

(22) Filed: Jul. 2, 2019

(65) Prior Publication Data
US 2020/0010176 A1    Jan. 9, 2020

(30) Foreign Application Priority Data
Jul. 4, 2018   (GB) ...................................... 1810958

(51) Int. Cl.
*B64C 3/18* (2006.01)
*B64C 3/34* (2006.01)
(Continued)

(52) U.S. Cl.
CPC ................ *B64C 3/38* (2013.01); *B64C 3/182* (2013.01); *B64C 3/34* (2013.01); *B64D 37/005* (2013.01)

(58) Field of Classification Search
CPC ........... B64C 3/182; B64C 3/34; B64C 1/064; B64D 37/005
See application file for complete search history.

(56) References Cited

U.S. PATENT DOCUMENTS 7,357,353 B2 *   4/2008   Stephens .................... B64C 3/18
                                                              244/123.3
8,408,493 B2 *   4/2013   Barnard ................... B64C 1/064
                                                              244/119
(Continued)

FOREIGN PATENT DOCUMENTS

EP    2987720    2/2016
GB    2527185    12/2015
(Continued)

OTHER PUBLICATIONS

Combined Search and Examination Report for GB1810958.7 dated Dec. 19, 2018, 8 pages.
(Continued)

*Primary Examiner* — Nicholas McFall
*Assistant Examiner* — Marisa V Conlon
(74) *Attorney, Agent, or Firm* — Nixon & Vanderhye P.C.

(57) ABSTRACT

A connector, a connector assembly, an aircraft fuel breather system and an aircraft wing are disclosed. The connector connects a breather pipe or float valve to a hat section stringer duct attached to an aircraft panel. The connecter has a bridge to bridge over the duct and to cover an aperture in a wall of the duct. The bridge has a flange on either side for attachment of the connector to the panel. The connector has a seal to seal the bridge to the duct, an aperture defined in the bridge and a flow controller connector to connect and provide fluid connection between the connector and pipe or float valve. The assembly comprises the connector, the duct and aircraft panel and the fuel breather system includes one or more fuel tanks, a breather pipe and a vent to atmosphere.

14 Claims, 7 Drawing Sheets

(51) Int. Cl.
  *B64C 3/38* (2006.01)
  *B64D 37/00* (2006.01)
  B64C 3/20 (2006.01)
  B64C 3/26 (2006.01)
  B64C 23/00 (2006.01)

(56) References Cited

U.S. PATENT DOCUMENTS

| | | | |
|---|---|---|---|
| 9,399,510 B2* | 7/2016 | Rolfes | B64D 37/005 |
| 2008/0302915 A1* | 12/2008 | Yip | B29C 70/342 |
| | | | 244/132 |
| 2013/0316147 A1* | 11/2013 | Douglas | B29D 99/0003 |
| | | | 156/60 |
| 2014/0284426 A1* | 9/2014 | Erickson | B64D 37/005 |
| | | | 244/135 R |
| 2015/0336656 A1* | 11/2015 | Rolfes | B64C 3/34 |
| | | | 244/123.1 |
| 2016/0052617 A1 | 2/2016 | Rolfes et al. | |

FOREIGN PATENT DOCUMENTS

| | | |
|---|---|---|
| JP | 2003-214585 | 7/2003 |
| JP | 2004-028163 | 1/2004 |
| JP | 2007-260937 | 10/2007 |
| WO | 2012/101439 | 8/2012 |

OTHER PUBLICATIONS

Extended European Search Report for European Application No. 19184290.5, seven pages, dated Dec. 2, 2019.

* cited by examiner

CONNECTOR

CROSS RELATED APPLICATION

This application claims priority to United Kingdom (GB) Patent Application 1810958.7, filed Jul. 4, 2018, the entire contents of which are hereby incorporated by reference.

FIELD OF THE INVENTION

The present invention relates to a connector for connecting an aircraft stringer duct to a pipe or other type of flow controller. In particular, the invention relates to such a connector which is capable of being releasably attached to the duct without penetrating the interior of the duct.

BACKGROUND

It is known to use aircraft hat section wing stringers as ducts to conduct fluids as both liquids and gasses spanwise of the wing. Stringers are stiffening members firmly attached to the skin, otherwise known as the cover, of the wing. They run spanwise of the wing, from wing root to wing tip. The cross-sectional shape of a hat stringer is defined by two spaced co-planar flanges for attachment of the stringer to a panel being stiffened, a pair of spaced upstanding webs attached to inner edges of the flanges and a crown bridging across distal edges of the webs. Such a stringer, when attached to a panel being stiffened, forms a closed channel which is capable of conducting fluids along its length.

In particular, with modern civil airliners using the space within the wing as fuel tanks, such hat section stringers may be used to conduct fuel, fuel vapour or air between fuel tanks spanwise of the wing. Such stringers have become known as fuel stringer ducts (FSDs) and in particular are used to vent air from a centre fuel tank and one or more wing tanks to a surge tank usually located in an outboard section of the wing. Air enters the FSD in a given tank via a bell mouth or a float valve located inside and near to the top of the tank. The bell mouth or float valve is usually connected to the FSD by a length of pipe.

Currently, one known method of attaching a pipe connector, usually an elbow connector, to the FSD is by adhesion. If the wing cover is made of carbon fibre reinforced plastics (CFRP), the FSD is likely to comprise the same material and to be co-cured in position against the cover to form an integrated reinforced structure. In such a case, a connector for connecting the pipe to the carbon fibre FSD is shaped to fit around the hat section of the FSD and to be adhered to the FSD either by co-curing in position or by the use of an adhesive. It will be noted that such an arrangement does not involve any intrusion of the connector or any of its affixing means into the duct itself. Thus, there is no disruption of fluid flow within the FSD. Such flow disruption results in pressure losses in the venting system. Intrusion of fasteners can also lead to the risk of electrostatic build up within the FSD being discharged through sparking.

However, the use of such a bonded connection between the connector and FSD means that, if damaged, the connector cannot easily be removed and replaced. Such connectors, because they sit proud of the FSD, are liable to damage.

A further difficulty with attachment of pipe connectors to FSDs is that the most convenient manner in which to make the fluid connection is normally through an aperture in a crown of the FSD. From the point of view of keeping any pipework attached to the FSD as close to the wing cover as possible, it would be desirable to connect the pipework to a web of the FSD. However, the web of the FSD is generally not as wide as the crown which makes attachment of pipework of sufficient diameter to the web difficult. A connector which allowed the aperture in the FSD to be in a crown thereof but which took the pipe connection from a web of the FSD would alleviate this problem.

BRIEF SUMMARY OF THE INVENTION

According to a first aspect of the invention there is provided a connector for releasably connecting a fluid flow controller to an aircraft stringer duct, the connector having a bridge to bridge over the stringer duct, a flange on either side of the bridge for attachment of the connector to the stringer duct, an aperture defined in the bridge for fluid passage between the stringer duct and connector, and a flow controller connector to connect the connector to a said flow controller.

Thus, a connector according to the invention may suitably fit around a stringer duct of any closed section, for example, an omega or hat section stringer.

The connector may be made of any suitable material exhibiting the required properties of strength, stiffness, lightness, durability, etc. Thus, metallic or thermoplastic materials are deemed suitable.

The connector may be attachable to the panel by fasteners passing through the flanges. This arrangement provides the advantage that the connector may be easily removed from the aircraft panel if damaged. In addition, the fasteners will not intrude into the duct which would impede fluid flow within the duct.

The bridge may comprise a pair of webs, each upstanding from a said flange and a crown bridging between the webs, and the flow controller connector may be positioned on the crown or on a web of the bridge.

The flow controller connector may comprise a pipe connector, optionally in the form of a threaded member or a flange defining apertures for fasteners. Alternatively, the flow controller connector may comprise a float valve connector which may be in the form of a pivot for the float valve.

The bridge may define a vent chamber therein, said vent chamber surrounding at least part of the duct, when fitted, and the bridge may include at least one seal to seal the aperture in the said wall of the duct within the vent chamber, in use.

At least one web may have a pillared structure with provision for fasteners between pillars. This arrangement provides structural rigidity to the connector with the fasteners being positioned between pillars and therefore taking up minimal space.

According to a second aspect of the present invention there is provided a connector assembly including a connector according to the first aspect, connected to an aircraft stringer duct and panel.

The assembly may include a reinforcing saddle interposed between the duct and connector, the saddle being permanently bonded to the duct. The duct and saddle may both comprise CFRP material and the saddle may be co-cured with the duct for saving on production time, optimum strength and durability of the assembly.

The saddle may have flanges adapted to engage the flanges of the connector, The saddle and connector may each have a hat cross section defining a generally flat crown, said crown defining the aperture, and in which sacrificial material may be provided between the crowns of the connector and saddle and between the flanges of the connector and saddle, said sacrificial material being removable as required to ensure a separation between the flanges and crown of the saddle measured in a direction normal to the flanges accurately matches such a distance between the flanges and crown of the connector.

Alternatively, the separation between the crown and flanges may be controlled by the use of hard tooling, at least for the crown and flanges, in the co-curing process.

The connector assembly may include a said flow controller, optionally in the form of a pipe, attached to the flow controller connector. The pipe may be a fuel breather pipe within a fuel tank of the aircraft. The pipe may be fitted with either a bell mouth or a float valve arrangement.

Alternatively, the flow controller may comprise a float valve directly operable on the connector via the flow controller connector.

In a preferred arrangement, the spaced webs and a crown of the bridge may define a said vent chamber, an aperture being defined in a web and a said float valve having a float and being pivotable about a flow controller connector in the form of a pivot. The float valve may include a closure for the aperture comprising a plate pivotable into and out of engagement with a portion of the web surrounding the aperture dependent upon a position of the float.

According to a third aspect of the invention there is provided an aircraft fuel breather system including one or more stringer ducts, one or more fuel tanks through which the stringer duct or ducts pass and a connector assembly according to the second aspect attached to the stringer duct in the or each fuel tank.

According to a fourth aspect of the invention there is provided an aircraft wing including a fuel breather system according to the third aspect.

BRIEF DESCRIPTION OF THE DRAWINGS

The invention will now be described, by way of example, with reference to the accompanying drawings in which:—

DETAILED DESCRIPTION OF THE PREFERRED EMBODIMENT

Figure 1:
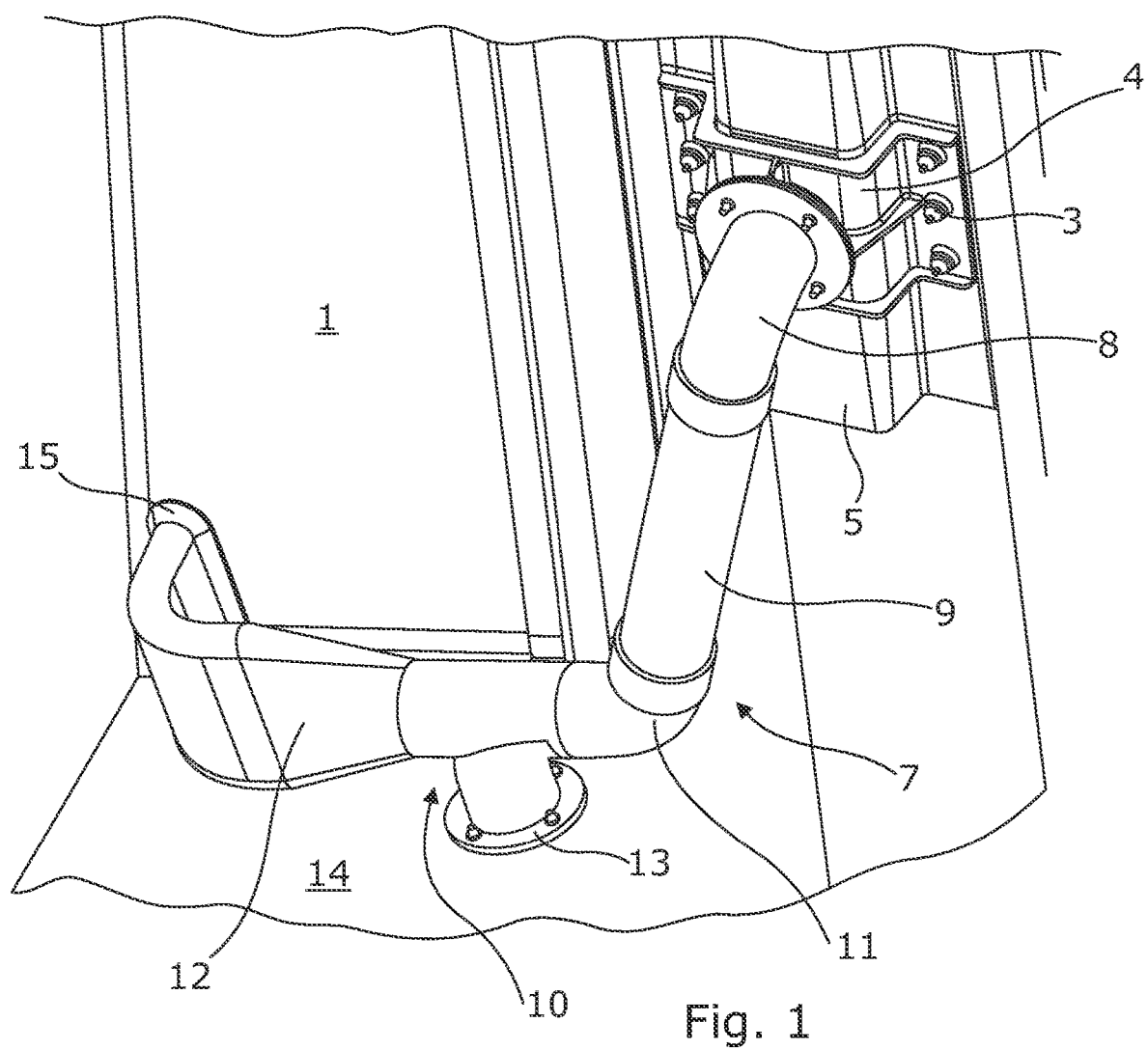
FIG. 1 is a perspective view from below of an aircraft fuel breather system according to a first embodiment of the invention.

Throughout the drawings, like features will where convenient be given the same reference numerals, for ease of understanding.

Figure 2:
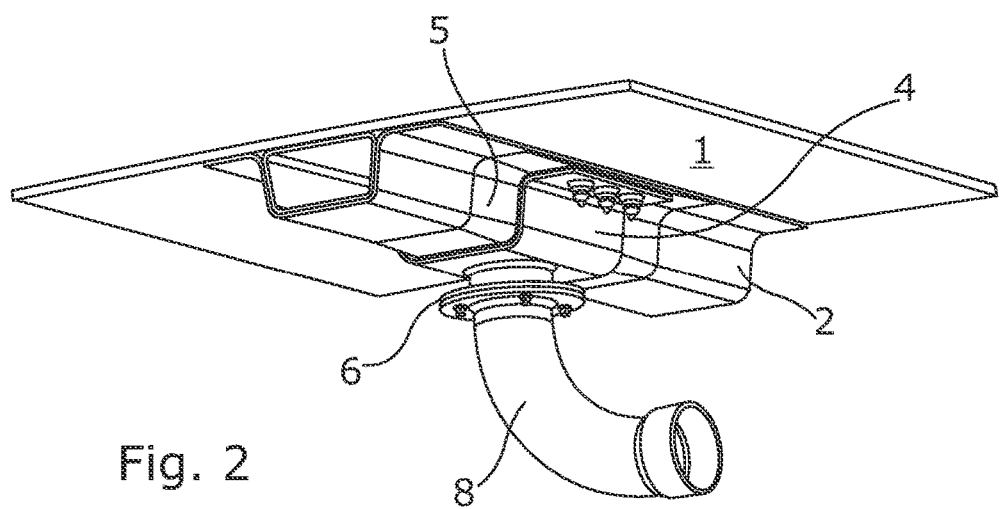
FIG. 2 is a perspective view of a variant of part of the system of FIG. 1.

With reference to FIGS. 1 and 2 of the drawings, an aircraft fuel breather system is shown. The system includes an aircraft skin panel or cover 1 of CFRP material to which is attached by co-curing a hat section stringer in the form of a CFRP FSD 2. Attached to the cover 1 and FSD 2 by fasteners 3 is a connector 4. Between the FSD 2 and connector 4 is interposed a CFRP reinforcing saddle 5 which has been co-cured with the cover 1 and FSD 2.

Attached to the connector 4 via a flow controller connector in the form of a pipe connector 6 (see FIG. 2) is a fuel breather pipe shown generally as 7. The pipe 7 is made up of a flow controller in the form of an elbow connector 8 connected to a straight floating pipe 9 via an internal seal (not shown) and thence via a second floating internal seal (not shown) to a transition pipe 10. The transition pipe 10 has a round elbow section 11 to engage the floating pipe 9, a transition section 12 which transitions the cross-sectional shape from circular to ovoid and includes a mount 13 to mount the breather pipe 7 to a wing rib 14 and an oval bell mouth 15 having an opening adjacent the cover 1.

The area shown is within a wing fuel tank 16 of the aircraft (see FIG. 19) and so fuel will at times almost fill the tank. This is the reason that the opening of the bell mouth 15 is positioned so near to the top cover 1 in order not to draw fuel into the breather system. As an alternative, the bell mouth 15 may be replaced by a float valve (see FIG. 11 and description) in order to prevent fuel from entering the breather system. The breather system operates to allow pressure equalization in the fuel system of the aircraft dependent upon changing fuel levels in the various fuel tanks and changes in atmospheric pressure caused by changes in height of the aircraft. The system operates in one direction by ullage gas from the space above fuel in the fuel tank being drawn by a lower pressure within the breather system, or forced by rising fuel level in the tank, into the pipe 7. The ullage then passes through the connector 4 into the FSD 2 and thence along a wing 17 (see FIG. 19) to the surge tank 20 near the wing tip 21. If, on the other hand, fuel level in the tank is dropping, air will be drawn from atmosphere through the breather system into the tank.

The connector of the invention by being attached to the wing cover 1 by fasteners 3, rather than by adhesion, may be removed and replaced if it or part of the breather system is damaged, faulty or requires servicing. In FIG. 1, it will be noted that the pipe 7 emerges from the elbow connector 8 almost parallel with the FSD 2, whereas, in FIG. 2, the elbow connector 8 emerges at right angles to the FSD 2. Any desired angle is possible.

Figure 3:
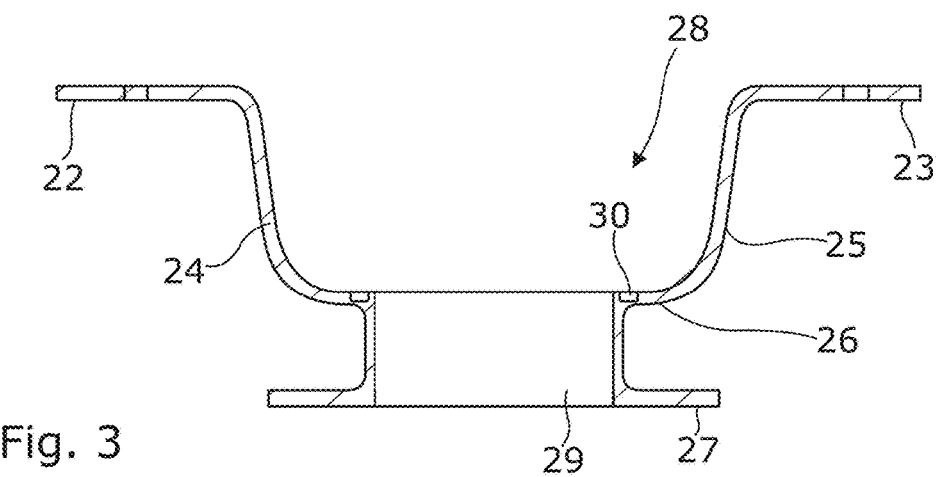
FIG. 3 is a side sectional view of a connector according to an embodiment of the invention.
Figure 4:
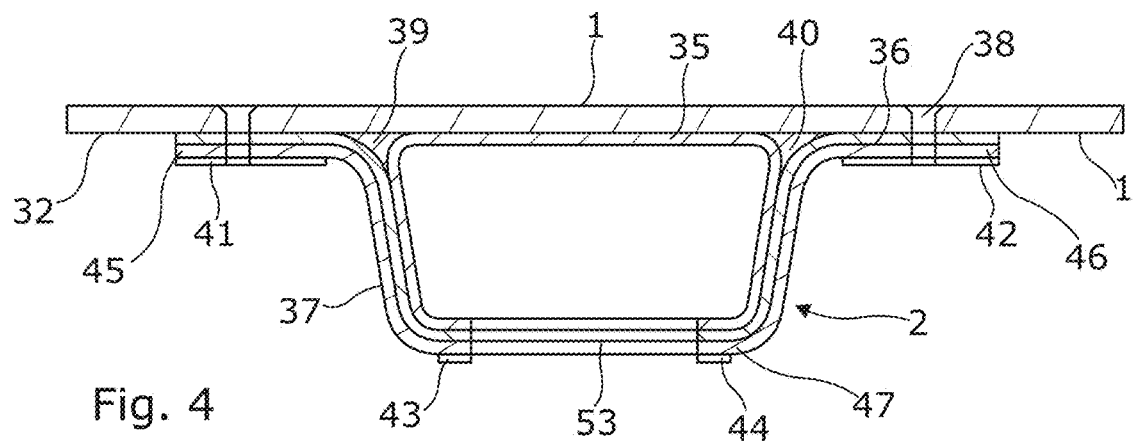
FIG. 4 is a side sectional view of an FSD, saddle and panel for use with the connector of FIG. 1.
Figure 5:
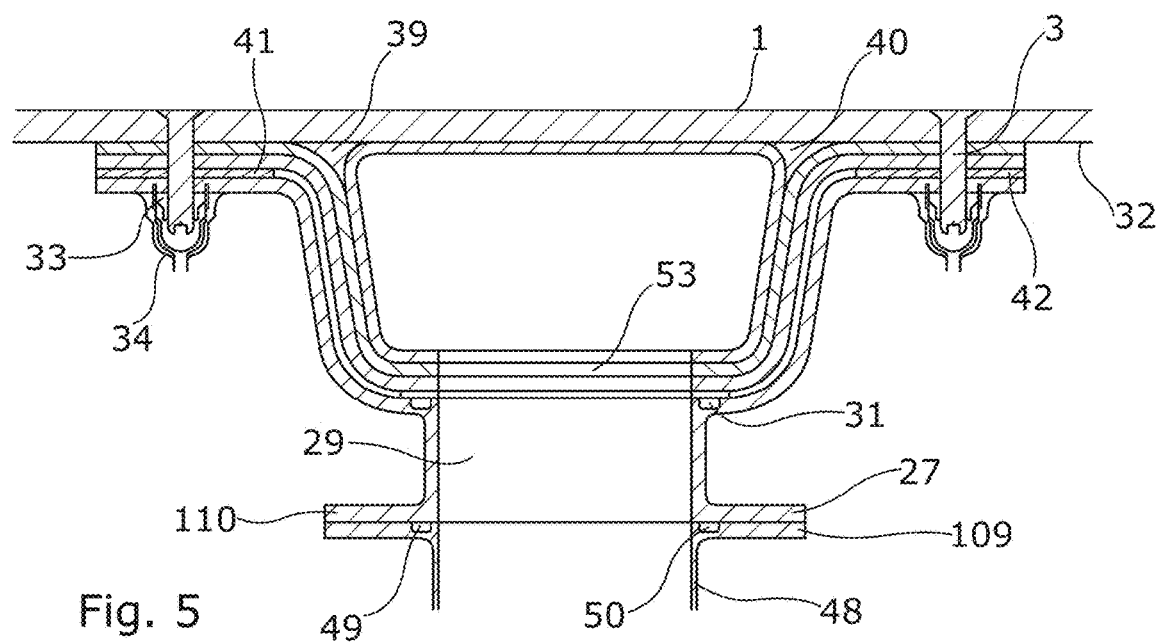
FIG. 5 is a side sectional view of an assembly of the connector of FIG. 1 and the FSD, saddle and panel of FIG. 4, together with a pipe connector.

FIGS. 3, 4 and 5 show sectional views of a connector and connector assembly of a similar design to that shown in FIGS. 1 and 2. In FIG. 3, a connector 4 according to the invention is made of stiff thermoplastic material and has a pair of spaced flanges 22, 23 for attachment of the connector 4 to an aircraft panel by fasteners similar to those shown in FIG. 1, a pair of spaced webs 24, 25 upstanding from the flanges 22, 23, a crown 26 bridging across the webs and a flow controller connector in the form of a pipe connector 27.

The webs 24, 25 and the crown 26 form the bridge and define a channel 28 therethrough to accommodate an FSD. The pipe connector 27 defines a circular aperture 29 therethrough for the passage of the fuel system ullage or air from atmosphere. Recess 30 accommodates a circular seal 31 (see FIG. 5) to seal the connector 4 to the FSD.

Referring to FIG. 4, a CFRP aircraft wing panel 1 is shown. To an interior surface 32 of the wing panel 1 is attached by a co-curing process a CFRP FSD 2. The FSD here comprises an internal duct ply 35, a flanged intermediate ply 36 and a flanged saddle 37. All have apertures 38 for the receipt of fasteners 3 therethrough, although, as explained above, the fasteners are not used to retain the FSD in position as it is co-cured with the panel 1. A crown 47 of the FSD 2 defines a circular aperture 53 therein positioned to line up with the aperture 29 of the connector 4.

Noodles 39, 40 fill voids which would otherwise exist between the wing panel 1, the internal ply 35 and the intermediate ply 36. Sacrificial glass fibre plies 41, 42, 43 and 44 are machined to a specified thickness to ensure that there is a specified separation, measured normal to the flanges 22, 23, between flanges 45, 46 and crown 47 of the FSD saddle 37. To ensure an accurate fit, this separation will be the same as a separation specified for the flanges 22, 23 and crown 26 of the connector 4.

Turning to FIG. 5, the connector 4 is shown fitted to the FSD 2. Countersunk fasteners 3 and swaged collars 33 with nutcaps 34 (see FIG. 5) hold the connector 4 in position over the FSD 2. Flow controller connector 27 of the connector 4 is fitted with a flow controller in the form of a pipe 48. The pipe 48 has a flange 109 which engages with a flange 110 of the flow controller connector 27. The pipe 48 is sealed to the flange 27 with a seal 49 in a groove 50. In practice, fasteners would be used to allow the pipe 48 to be removed for maintenance, etc., but they are not shown here.

Thus, the embodiment of FIGS. 3, 4 and 5 shows an assembly according to the invention in which the pipe 48 is mounted to the connector 4 at its crown 26. It is not always appropriate or desirable to mount the pipe in this way because the pipe will as a result be located a greater distance from the wing panel 1 than it would be if it emerged from one of the webs 24, 25 of the connector 4. Mounting the pipe 48 to a web of the connector would route it considerably closer to the wing panel and thus bring the bell mouth naturally nearer to the panel 1.

Figure 6:
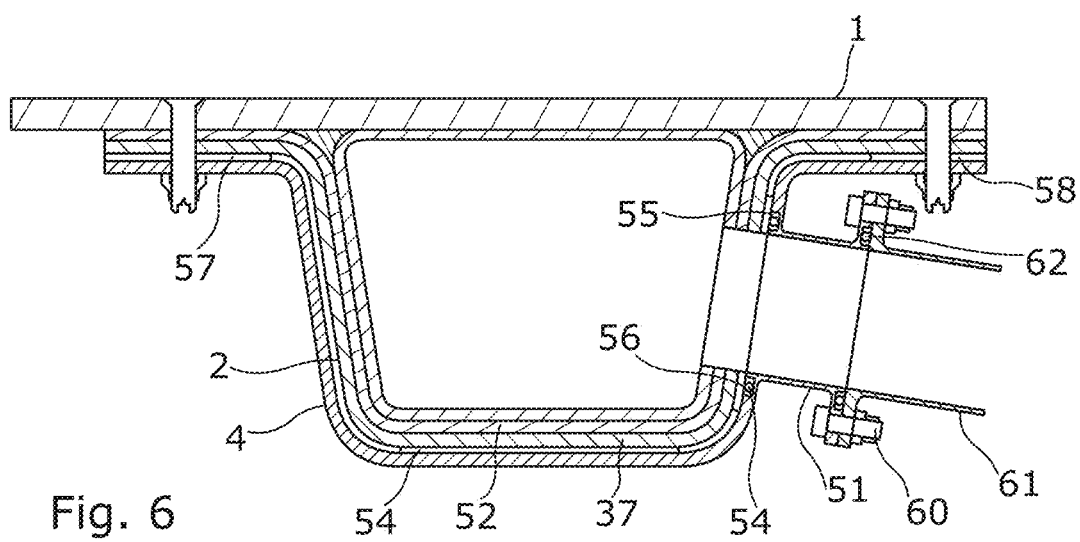
FIG. 6 is a side sectional view of an assembly according to one embodiment of the invention with a connector having a sidewall or web flow controller connector.

The embodiment shown in FIG. 6 has such a connector 4 with a web mounted flow controller connector 51. In addition to the advantage stated above of mounting the pipe to the web of the connector, this arrangement also avoids forming any apertures in a crown 52 of the FSD 2 which in some circumstances may be desirable. The connector 4 is sealed to the saddle 37 by a peripheral seal 54 set in a groove 55 of the connector. The seal 54 bears upon a sacrificial layer 56 of glass fibre material. Similar sacrificial layers 57, 58, 59 of glass fibre material are positioned between the saddle 37 and connector 4, all of which may be machined, as previously described, to ensure a perfect fit of the connector 4 over the saddle 37.

Attached to the flow controller connector 51 by fasteners 60 is a flow controller in the form of a pipe 61. This pipe is similarly sealed to the flow controller connector 51 by a peripheral seal 62. It will be seen that the pipe 61 emerges from the flow controller connector 51 in close proximity to the panel 1 and requires no 90° connector to direct the pipe across the wing.

Figure 7:
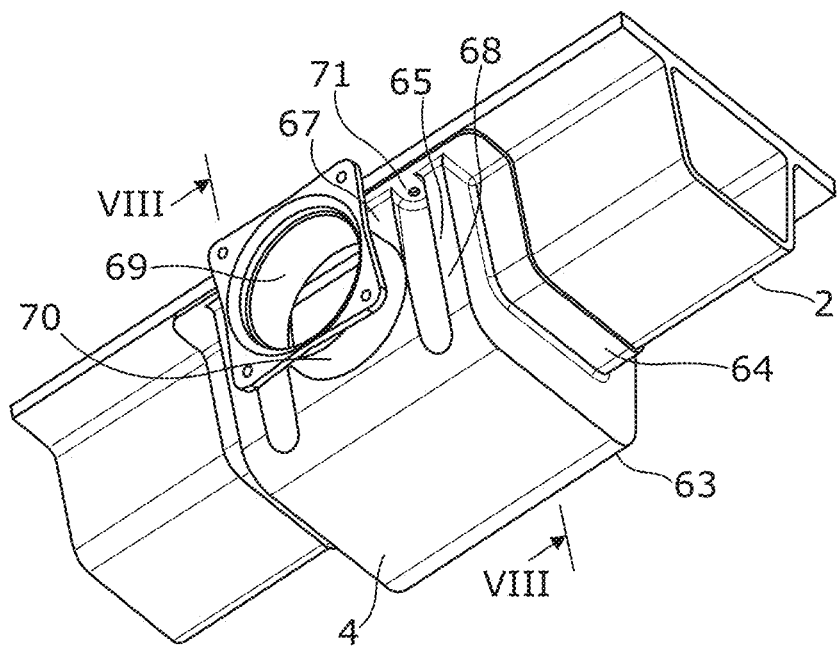
FIG. 7 is an isometric view from below and to one side of a connector assembly according to another embodiment of the invention, having a side flow controller connector.
Figure 8:
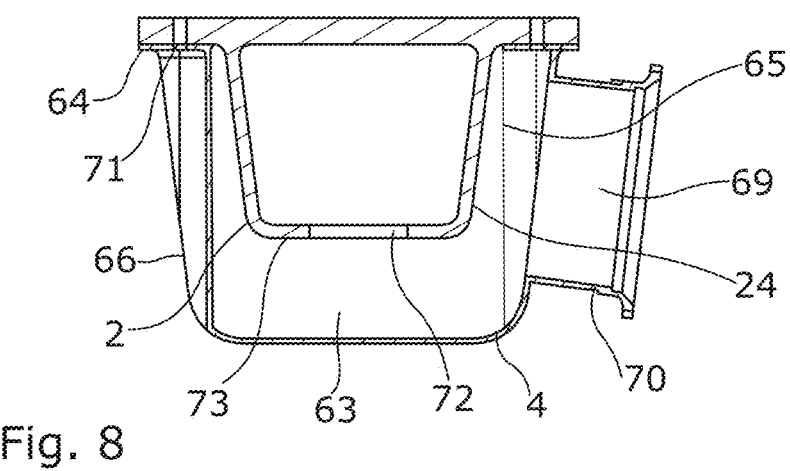
FIG. 8 is a section taken on the line VIII-VIII of FIG. 7.

FIGS. 7 and 8 illustrate a connector according to a further embodiment of the invention. In this embodiment, the connector 4 defines a vent chamber 63 around the FSD 2. The vent chamber 63 is sealed to the FSD 2 by a peripheral flange 64 passing right around the connector 4. A fluid tight seal between the flange 64 and the FSD is obtained by the use of liquid sealant (not shown) or by employing a resilient seal in a groove (again, not shown) of the kind shown in the previous figures. Webs 65, 66 of the connector have a pillared structure with provision for fasteners (not shown) between pillars 67, 68. This design provides excellent rigidity and space efficiency of the connector 4, with the pillared structure allowing the vent chamber 63 to extend to either side of the FSD 2 while at the same time making provision for the use of fasteners to pass through apertures 71 in the surrounding flange 64.

It will be observed that the diameter of orifice 69 of flow controller connector 70 is larger than a height of the web 24 of the FSD 2. Thus, the use of vent chamber 63 for the connector 4 has permitted the use of a side connection for a pipe to the connector 4 of which the diameter is larger than a height of the web 24. An aperture 72 in a crown 73 of the FSD may be elongated or duplicated, if required, to obtain a desired overall size as its size and shape is not linked to that of the orifice 69 of the flow control connector 70.

Thus, rather than connecting a pipe directly into an aperture in the FSD, as in the earlier embodiment, this embodiment, by employing a vent chamber 63 to transfer ullage between an aperture 72 in the FSD and a flow controller connector 70 in the connector 4 provides design flexibility. Thus, the direction in which a pipe (not shown) attached to the flow controller connector 70 emerges from the connector 4 is not bound by the positioning of the aperture in the FSD.

Figure 9:
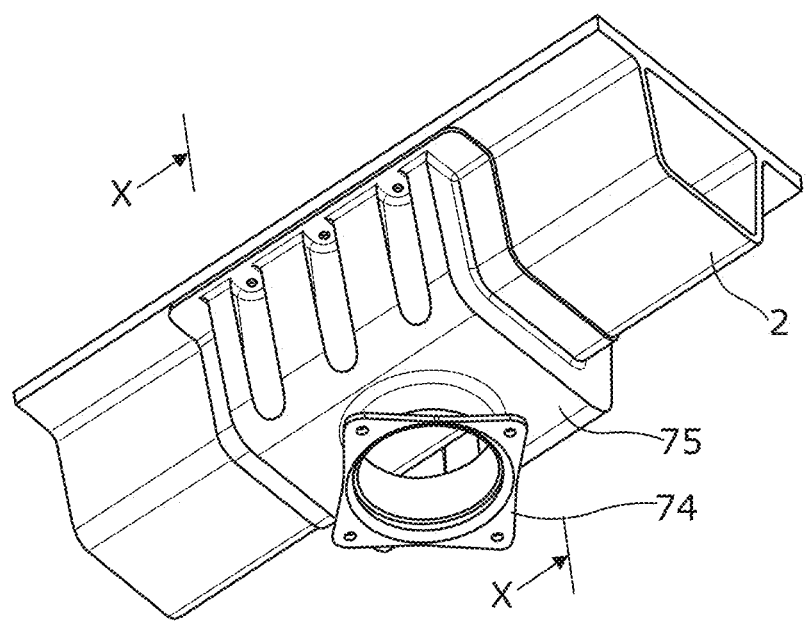
FIG. 9 is an isometric view from below and to one side of a connector assembly according to a further embodiment of the invention, having a crown flow controller connector.
Figure 10:
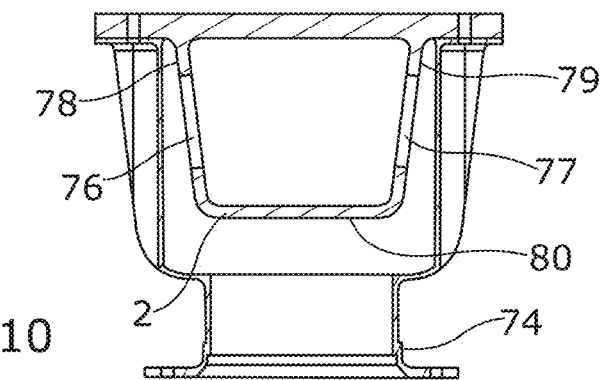
FIG. 10 is a section taken on the line X-X of FIG. 9.

The flexibility afforded by this embodiment is further illustrated in FIGS. 9 and 10. Here, flow controller connector 74 is positioned on crown 75 of the connector 4 to allow a pipe (not shown) connected to the flow controller connector 74 to be routed directly downwardly from the FSD 2. It will be observed that apertures 76, 77 in the FSD 2 are formed in webs 78, 79 of the FSD 2, rather than in a crown 80 thereof. Such positioning of apertures 76, 77 may be used to avoid penetrating the crown 80 and thereby losing strength in the crown. Again, apertures 76, 77 may be elongated, if required to obtain a desired area of opening.

Figure 11:
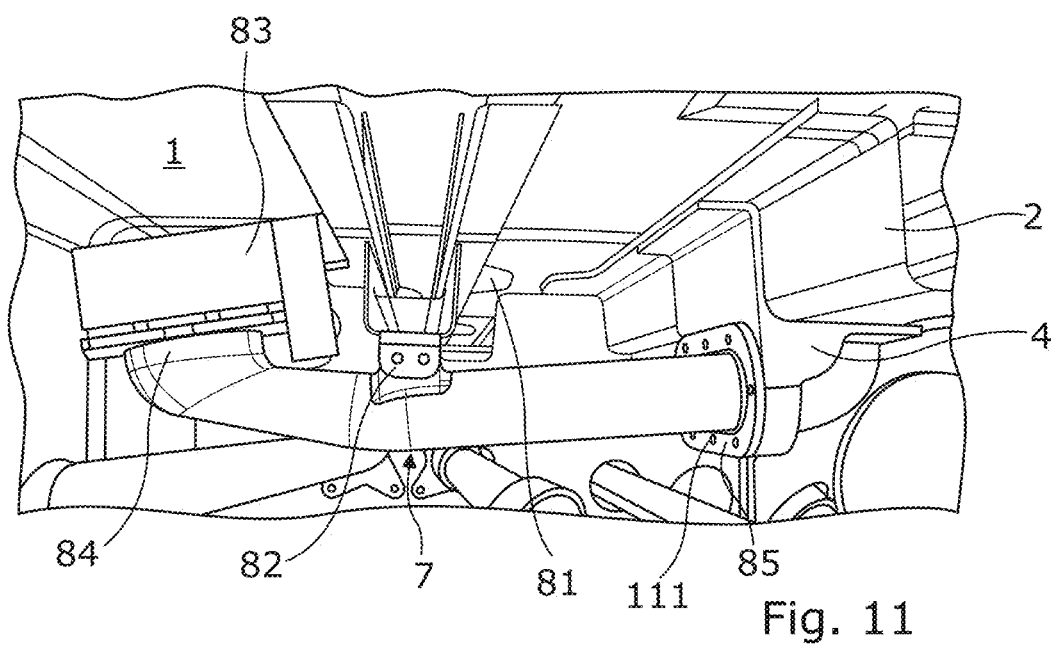
FIG. 11 is a schematic perspective view of part of an aircraft fuel breather system according to one embodiment of the invention.

Turning now to FIGS. 11, 12, 13 and 14, a further embodiment of the connector is shown. FIG. 11 is a schematic general perspective view, internally of an aircraft fuel tank, of part of a fuel breather system according to the invention. An FSD 2, running spanwise of the aircraft wing has a connector 4 according to this embodiment of the invention attached to it. The connector 4 has a flow controller in the form of a breather pipe 7 attached to it by fasteners (not shown) passing through apertures 111 attaching a flange 85 of the pipe 7 to the connector 4. The breather pipe 7 passes chordwise of the wing underneath a further hat section wing stringer 81 and is attached to this stringer 81 by a bracket 82. A float vent valve 83 is attached to an end 84 of the breather pipe 10. The float valve 83 allows ullage from above fuel (not shown) in the tank to flow into the pipe 7 when the fuel is below a preset level. This avoids, as far as possible, fuel entry into the breather pipe 7.

Figure 12:
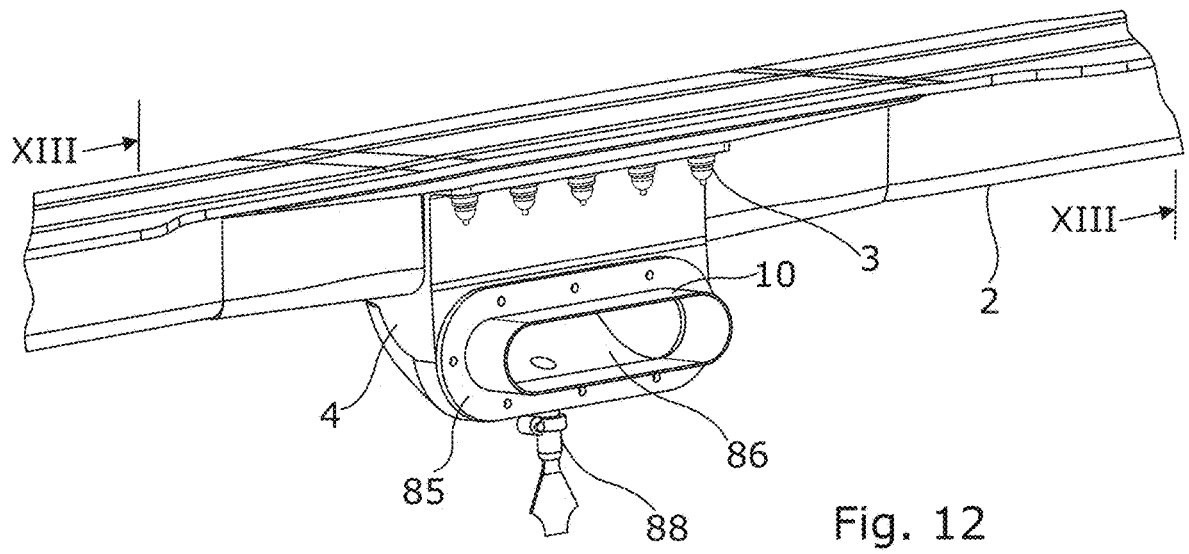
FIG. 12 is a perspective view from above and one side of a connector assembly according to a further embodiment of the invention.
Figure 13:
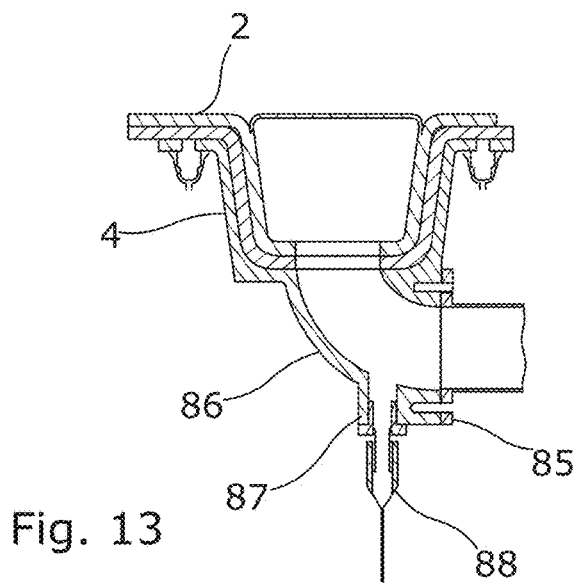
FIG. 13 is a section taken on the line XIII-XIII of FIG. 12.
Figure 14:
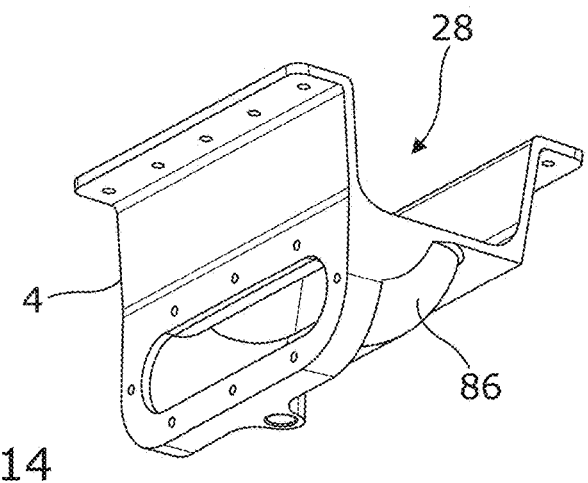
FIG. 14 is a perspective view of a connector according to a further embodiment of the invention.
Figure 15:
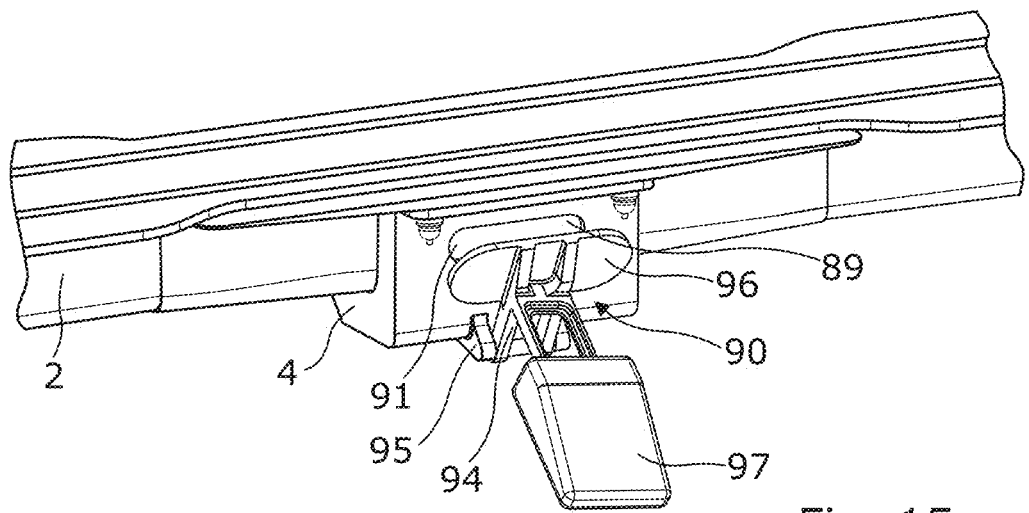
FIG. 15 is a perspective view from above and one side of a connector assembly according to a further embodiment of the invention.

FIGS. 12, 13 and 14 show detail of the connector 4, illustrated in FIG. 11. Referring to FIG. 14, the connector 4 is of generally similar configuration to those discussed above, having a generally hat shaped cross section defining a channel 28 therethrough. However, this connector differs from that shown in FIGS. 1 to 6 by including a transition region 86 controlling fluid flow through a 90° bend. It can be seen that this arrangement takes up less space, vertically in use, than the embodiment shown in FIGS. 1 to 5. In FIGS. 1 to 5, the elbow connector 8 controls fluid flow through the same 90° but occupies more vertical space and directs a pipe 7 connected to the elbow connector 8 considerably further away from the panel 1 and hence lower in the fuel tank. The use of a separate elbow connector 8 is also avoided. Depending downwardly from a lower extremity 87 of the connector 4 is a one-way valve 88. This valve drains unwanted liquid from the fuel breather system.

Turning now to FIGS. 15 to 18, there is shown a connector 4 according to a further embodiment of the invention. This connector has a vent chamber 89 and a flow controller in the form of a float valve 90 selectively blocking an opening 91 into the vent chamber 89. It will be observed that the vent chamber 89 only extends around two sides, the crown 26 and one web 25, of the FSD 2.

This design is effectively removing the need for a separate fuel breather pipe as entry into the connector, for ullage, is moved from an end 84 of the pipe such as that shown in FIG. 11 to the connector 4 itself. It will be observed that the location of the opening 91 is close to a flange 92 of the connector which, in use, will be extremely close to an upper wing panel to which the flange 92 will be attached. It will be seen that this connector 4 provides an extremely neat entry and exit port for the FSD 2. So long as fluid entry into the breather system is not required at a location spaced chordwise of the wing from the FSD, the connector 4 provides a simple, compact, lightweight and space-saving design solution for breather system entry.

Figure 16:
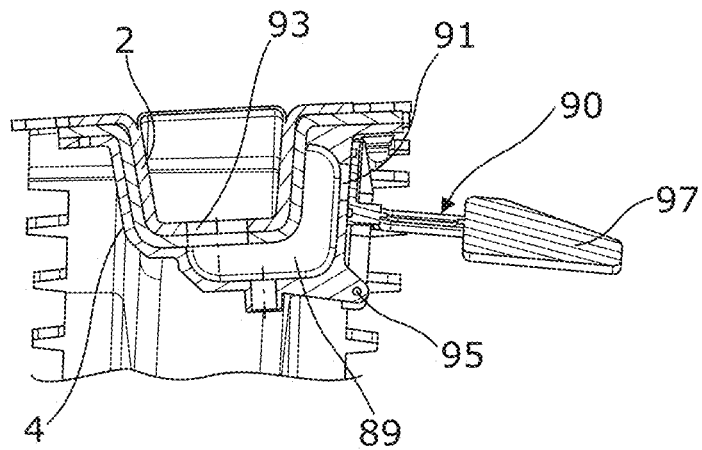
FIG. 16 is a side sectional view of a connector assembly similar to that shown in FIG. 15.
Figure 17:
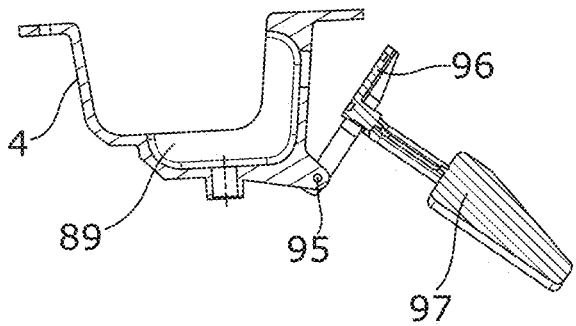
FIG. 17 is a side sectional view of the connector shown in the assembly of FIG. 16.
Figure 18:
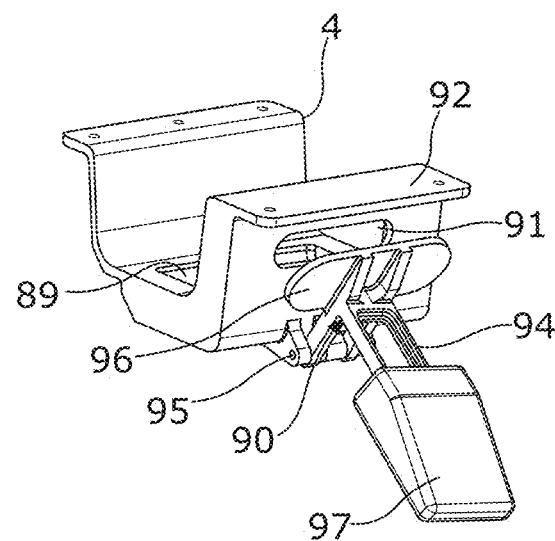
FIG. 18 is a perspective view of the connector shown in FIG. 17.

Looking at FIG. 16, it will be seen that the vent chamber 89 provides a fluid connection between an aperture 93 in the FSD 2 and the opening 91 in the vent chamber 89. The flow controller float valve 90 comprises an arm 94 turning on a flow controller connector in the form of a pivot 95 and having a valve plate 96 which selectively covers and seals the aperture 91, depending upon a position to which a float 97 has been urged by fuel in the tank. Thus, a lower fuel level will allow the float 97 to pivot downwardly and pivot the valve plate 96 away from the opening 91 in the vent chamber 89, as shown in FIG. 17. Ullage may then enter or leave the FSD 2 of the breather system through the connector 4. If the fuel level rises, as shown in FIG. 16, the float 97 will be pivoted upwardly so that the valve plate 96 eventually closes and seals the opening 91 in the vent chamber 89, preventing fluid flow into or out of the breather system.

Figure 19:
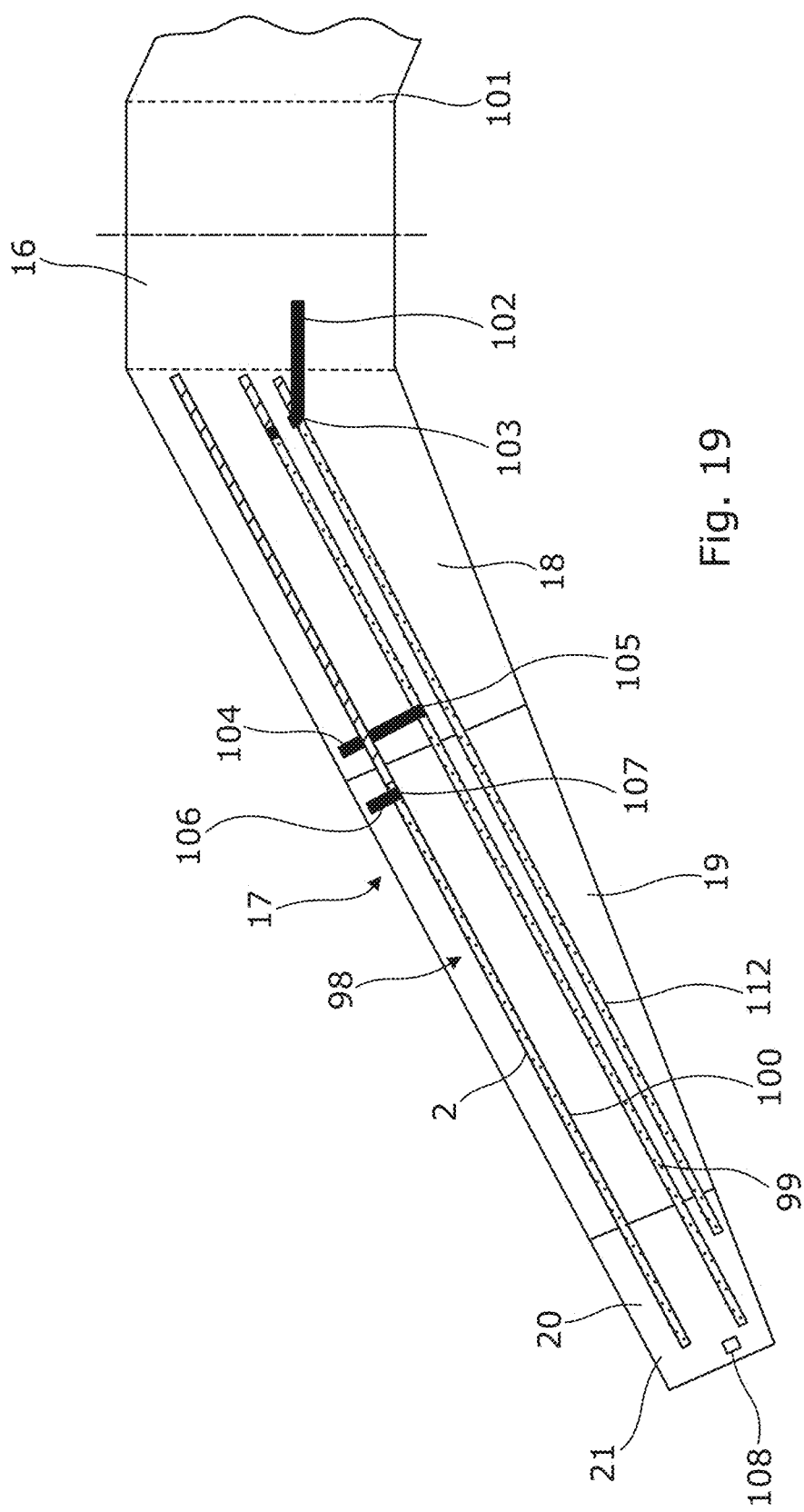
FIG. 19 is a schematic plan view of an aircraft wing having a fuel breather system according to the invention.

In FIG. 19, a wing 17 and breather system 98 according to the invention are shown. The wing 17 includes four fuel tanks 16, 18, 19 and 20 having the fuel breather system 98 passing through all four tanks. Three FSDs 99, 100, 112 extend through tanks 18, 19 and 20 along an upper wing cover 1. Centre tank 16, within a fuselage 101 of the aircraft, has a fuel breather pipe 102 extending therefrom into wing tank 18 to connect, via a connector 103 of the invention, to FSD 112. In tank 18, fuel breather pipe 104 feeds into FSD 99 via connector 105. In tank 19, fuel breather pipe 106 feeds into FSD 100 via connector 107. FSDs 99, 100, 112 all pass into surge tank 20. The FSDs 99, 100, 112 may be open ended, have apertures formed in the crown or webs or may employ a connector and breather pipe, in order to vent to atmosphere. Surge tank 20 would normally communicate with a NACA duct or similar 108 to vent the tank to atmosphere.

The embodiments described herein are respective non-limiting examples of how the present invention may be implemented. Any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined by the accompanying claims.

The word "or" as used herein is to be interpreted as meaning "and/or" unless otherwise stated.

The invention claimed is:

1. A connector assembly including a connector and a stringer duct, wherein the connector releasably connects a fluid flow controller to the stringer duct, the stringer duct includes a pair of opposing webs connected to a first crown at one end thereof, the connecter having a bridge comprising a pair of spaced webs and a second crown,
    wherein the connector is disposed over the stringer duct creating a vent chamber between the aircraft stringer duct and the connector,
    a flange on either side of the bridge for attachment of the connector to the stringer duct,
    an aperture defined in the bridge of the connector for fluid passage between an aperture in a wall of the stringer duct and the flow controller via the vent chamber,
    a flow controller connector to connect the connector and the flow controller, and
    wherein the flow controller connector includes an orifice transverse to one of the pair of opposing webs.

2. The connector assembly according to claim 1, in which the connector is attachable to a panel by fasteners passing through the flanges.

3. The connector assembly according to claim 1, in which the bridge includes at least one seal to seal an aperture in a wall of the stringer duct within the vent chamber.

4. The connector assembly according to claim 3, wherein the pair of spaced webs and the second crown bridging the pair of spaced webs form a sealing fit to said stringer duct having said first crown and said pair of opposing webs and in which the vent chamber extends between the crown and at least one web of the bridge whereby in use to allow fluid flow between an aperture in one of stringer duct crown and web and an aperture defined in the other of the bridge crown and web.

5. The connector assembly according to claim 4, in which at least one of the pair of spaced webs has a pillared structure with provision for fasteners between pillars.

6. The connector assembly according to claim 1, wherein a reinforcing saddle is interposed between the stringer duct and connector, the saddle being permanently bonded to the stringer duct.

7. The connector assembly according to claim 6, in which the stringer duct and saddle comprise carbon fibre reinforced plastics (CFRP) material.

8. The connector assembly according to claim 6, in which the saddle has flanges adapted to engage the flanges of the connector, the saddle and connector each have a hat cross section defining a generally flat crown which defines an aperture, and in which sacrificial material is provided between the first crown of the connector and saddle and between the flanges of the connector and saddle, said sacrificial material being removable as required to ensure a separation between the flanges and crown of the saddle measured in a direction normal to the flanges accurately matches such a separation between the flanges and crown of the connector.

9. The connector assembly according to claim 1, including a said flow controller comprising a breather pipe attached to the flow controller connector.

10. The connector assembly according to claim 1, including a said flow controller comprising a float valve directly attached to the flow controller connector.

11. The connector assembly according to claim 10, in which the flow controller connector comprises a pivot for the float valve, the float valve including a float and a closure for a said aperture in a said web of the bridge, said float and closure being linked for pivotal movement together about the pivot.

12. The connector assembly according to claim 11, in which the closure for the aperture comprises a plate pivotable into and out of engagement with a portion of the web surrounding the aperture dependent upon said pivotal movement of the float.

13. An aircraft fuel breather system including at least one fuel tank, a connector assembly according to claim 1, and means to vent the stringer duct to atmosphere.

14. An aircraft wing including a fuel breather system according to claim 13.

\* \* \* \* \*